(12) United States Patent
Benboubakeur et al.

(10) Patent No.: US 10,592,550 B2
(45) Date of Patent: Mar. 17, 2020

(54) SYSTEM AND METHOD FOR SPECIES AND OBJECT RECOGNITION

(71) Applicant: INTERNATIONAL BUSINESS MACHINES CORPORATION, Armonk, NY (US)

(72) Inventors: Moncef Benboubakeur, Brno (CZ); Dorota Buresova, Brno (CZ); Julija Narodicka, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 15/783,362

(22) Filed: Oct. 13, 2017

(65) Prior Publication Data
US 2019/0114333 A1 Apr. 18, 2019

(51) Int. Cl.
| | |
|---|---|
| *G06F 16/583* | (2019.01) |
| *G06K 9/00* | (2006.01) |
| *G06K 9/62* | (2006.01) |
| *G06F 16/58* | (2019.01) |
| *G06K 9/32* | (2006.01) |
| *G06K 9/46* | (2006.01) |

(52) U.S. Cl.
CPC ...... *G06F 16/5838* (2019.01); *G06F 16/5866* (2019.01); *G06K 9/0063* (2013.01); *G06K 9/00362* (2013.01); *G06K 9/00664* (2013.01); *G06K 9/3233* (2013.01); *G06K 9/4604* (2013.01); *G06K 9/4652* (2013.01); *G06K 9/6262* (2013.01)

(58) Field of Classification Search
CPC ............ G06F 16/5838; G06F 16/5866; G06K 9/3233; G06K 9/00362; G06K 9/4652; G06K 9/4604
See application file for complete search history.

(56) References Cited

U.S. PATENT DOCUMENTS

| | | | | |
|---|---|---|---|---|
| 2005/0097510 A1* | 5/2005 | Manuel | ................. | G06F 9/4411 717/108 |
| 2008/0170792 A1* | 7/2008 | Ono | ..................... | G06K 9/6203 382/209 |

(Continued)

OTHER PUBLICATIONS

Combined Search and Examination Report under Sections 17 and 18(3) dated Mar. 19, 2019 from the Intellectual Property Office, UK; Application No. GB1815272.8; 8 pages.

*Primary Examiner* — Ming Y Hon
(74) *Attorney, Agent, or Firm* — Schmeiser, Olsen & Watts; Mark C. Vallone

(57) ABSTRACT

The present invention provides a method and system for identifying a species or object having identifying property markers by comparing the markers with values stored in a database, then comparing a group of species/objects which meet a predetermined threshold level to select a species/object having a highest confidence level. If the species/object having the corresponding highest species confidence level does not meet a predetermined species/object confidence level threshold value stored in the database, then a feedback loop provides for gathering additional information to accurately identify the species by repeating the above-identified steps in consideration of the additional information until a species/object meets or exceeds the predetermined species confidence level threshold value.

4 Claims, 7 Drawing Sheets

(56) References Cited

U.S. PATENT DOCUMENTS

| | | | |
|---|---|---|---|
| 2011/0255738 A1* | 10/2011 | Gao | G06K 9/228 |
| | | | 382/103 |
| 2013/0127893 A1 | 5/2013 | Gokturk et al. | |
| 2013/0170706 A1* | 7/2013 | Mori | G01C 21/3602 |
| | | | 382/103 |
| 2013/0278760 A1* | 10/2013 | Beams | H04N 7/18 |
| | | | 348/143 |
| 2014/0140570 A1* | 5/2014 | Ross | G06K 9/00577 |
| | | | 382/100 |
| 2014/0211067 A1 | 7/2014 | Penov et al. | |
| 2014/0222783 A1 | 8/2014 | Chang et al. | |
| 2014/0245200 A1* | 8/2014 | Holz | G06F 3/017 |
| | | | 715/764 |
| 2014/0304271 A1* | 10/2014 | Lu | G06K 9/3241 |
| | | | 707/740 |
| 2015/0127430 A1* | 5/2015 | Hammer, III | G06Q 10/087 |
| | | | 705/7.35 |
| 2015/0134651 A1 | 5/2015 | Holzer et al. | |
| 2016/0004913 A1 | 1/2016 | Park | |
| 2016/0092736 A1 | 3/2016 | Mai | |
| 2016/0292502 A1* | 10/2016 | Bostick | G06K 9/00442 |
| 2017/0024388 A1* | 1/2017 | Bentley | G06F 16/9537 |
| 2017/0243230 A1* | 8/2017 | Ross | G06K 9/4604 |
| 2017/0278245 A1 | 9/2017 | Anastassacos | |
| 2018/0004213 A1* | 1/2018 | Absmeier | G05D 1/0297 |

\* cited by examiner

SYSTEM AND METHOD FOR SPECIES AND OBJECT RECOGNITION

TECHNICAL FIELD

The invention relates generally to the field of species and object recognition, and in particular to a method and system for increasing a level of confidence of visual recognition of an object identified in a photograph by interacting and guiding a user through one or more feedback loops.

BACKGROUND

There are many systems currently working with visual recognition to define the classification of objects. Typically a user takes a photograph which is compared with pictures in a database to provide a resulting match having a certain confidence level. Accordingly, there is a need for improved systems and methods to accurately identify both a species of objects, and an object within a species of objects.

SUMMARY

The present invention provides a method, and associated computer system and computer program product, for identifying an initial photograph received by user request via a user interface of the computer system containing one or more markers from a list of predefined markers stored in a database of a computer system whereby each marker present in the initial photograph includes (1) a property of the object, (2) a measured value of the property, (3) identification of an entity for measuring the value of the property of the marker, and (4) an association with one or more species of objects. One or more species of the object associated with each marker present in the initial photograph is identified, by an identification and analysis component of the computer system, by comparing the measured values of the properties of the one or more markers present in the initial photograph of the object with classifiers of species compiled in the database. For each identified species a species confidence level of species identification of the object is determined, by the identification and analysis component of the computer system, by comparing the measured values of the properties of the one or more markers present in the initial photograph with predetermined marker threshold values stored in the database for each identified species. The species identified as having a corresponding highest species confidence level in comparison to the species confidence levels of the other identified species is selected by the identification and analysis component of the computer system and presented to the user. If the species having the corresponding highest species confidence level does not meet a predetermined species confidence level threshold value stored in the database, then a feedback loop provides for gathering additional information to accurately identify the species by repeating the above-identified steps in consideration of the additional information until a species meets or exceeds the predetermined species confidence level threshold value. The same methodology and steps described above are used to identify a single object located within a positively identified species.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

Figure 1:
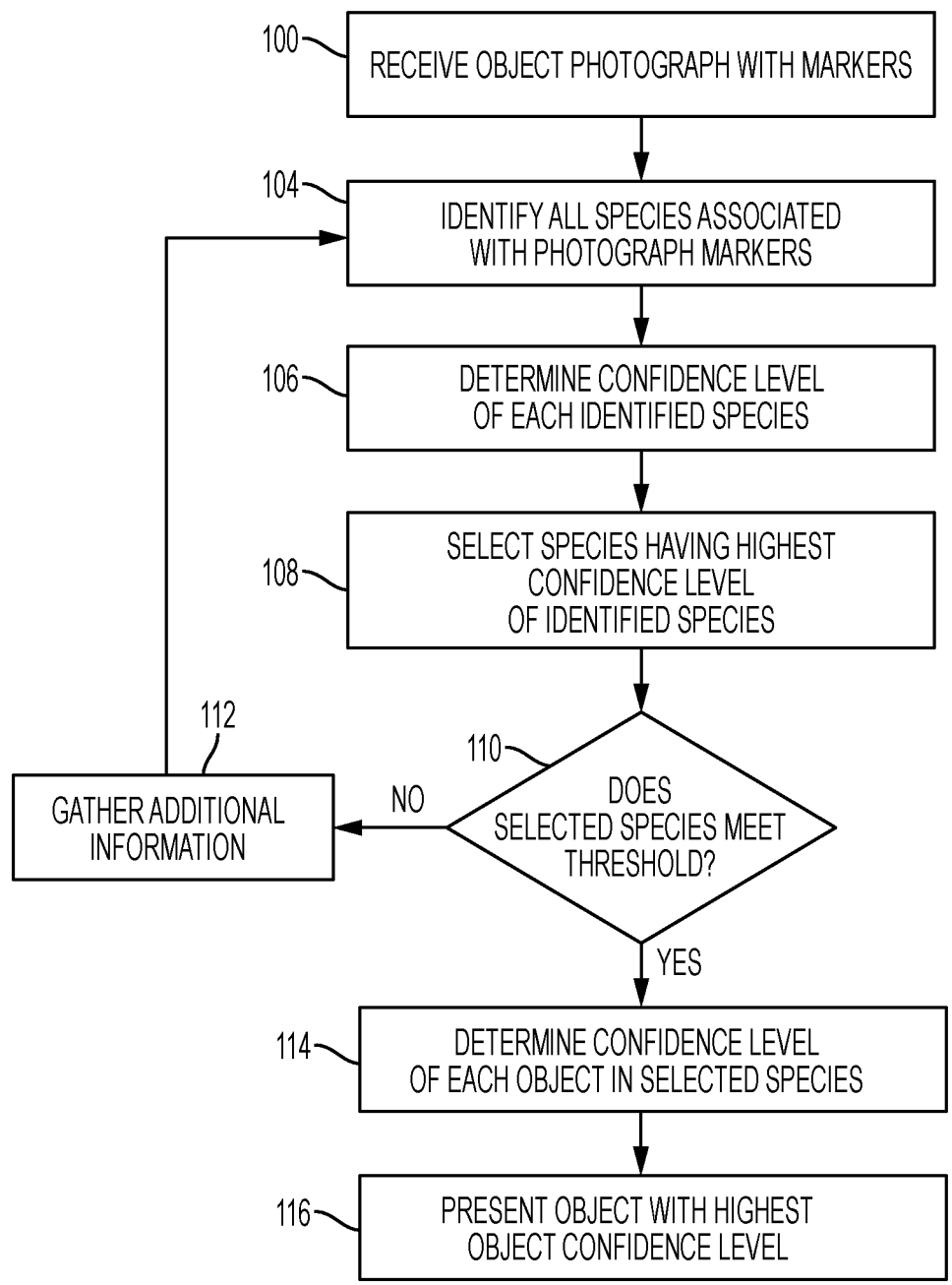
FIG. 1 is a flow chart diagram of a method in accordance with a first embodiment of the present invention.

FIG. 1 is a flow chart diagram of a method in accordance with a first embodiment of the present invention. In step 100 an initial photograph of an object to be identified is received in response to a user request via a user interface of an object recognition computer system. The initial photograph contains one or more markers from a list of predefined markers stored in a database of the computer system. The database contains lists of species of objects, objects within each species, and markers associated with identifying various objects and species. Markers that are present in the initial photograph are compared and matched to markers in the database to assist in identification of an object or a species.

In step 104 the markers within the initial photograph are used to identify all species in the database which include those identified markers. This process step is done by an identification and analysis component of the computer system. Each marker present in the initial photograph includes (1) a property of the object to be identified, (2) a measured value of the property, (3) identification of an entity for measuring the value of the property of the marker, and (4) an association with one or more species of objects.

The properties of an object can include characteristics such as, but not limited to, color; size; dimensions; shape; location; mobility; stability; edibility; smell; sound emanating from the object; age; altitude above sea level; reflectivity; density; radioactivity; temperature; porosity; and change in appearance. For instance if the object to be identified from the photo is a type of tree, then some of the appropriate properties or characteristics of the tree (e.g. the species) could include the tree's dimensions such as its height and width, its color, its location (e.g. in Siberia or in the Amazon jungle), etc. In another instance if the object to be identified from the photo is a vehicle, then appropriate properties could include mobility (movement) which could be detected from the object's position changing in sequential photographs, its shape (e.g. rectangular or oblong), its location (e.g. in an ocean), etc. Additional information relating to the object to be identified, but not present in the photograph, can be requested by the user, such as sound emanating from the object (e.g. an engine sound from a vehicle, or an animal sound from an animal), etc.

Examples of measured values of marker properties include, for instance the height of an object which can be approximated from a photograph by comparing surrounding features of known height within the photograph. For instance in one example if the object to be identified is a building and the photograph shows the building with people standing in front of it, then the height of the building can be approximated by comparison of the height of the building with the height of the people. In another example if the object to be identified is associated with various species of objects such as airplanes, helicopters, rockets, etc., then a marker property of altitude can be measured is to determine the altitude of the object above ground. The measurement of this altitude marker property can be accomplished using a geolocation API (application programming interface) for the wireless detection of the physical location of a remote device (i.e. the object). Geolocation is the process of finding, determining and providing the exact location of a computer, networking device or equipment based upon geographical coordinates and measurements, and it commonly uses a global positioning system (GPS) and other related technologies to assess and specify geographical locations. In this case the object to be identified is a helicopter, the marker property is altitude, a measured value of the altitude of the object is 200 meters above the ground, and the entity for measuring the altitude is a geolocation API.

In FIG. 1, the object of be identified is a tree and the marker properties of the object include, for instance, color, shape and location of the object. Measured values of the properties are compared with species classifiers listed in a database of the computer system. In this example the markers of the object (tree) of the initial photograph identify three species of plant life. A confidence level of each identified plant species is determined in step 106 wherein one identified species has a confidence level of 0.50, the second has a confidence level of 0.62 and the third has a confidence level of 0.80. These confidence levels are determined by comparing the measured properties of the photograph markers with known species characteristics from the database.

The confidence level of each identified species to accurately identify the object is determined by the identification and analysis component of the computer system in step 106 as a percentage, represented by an associated numerical value between 0 and 1.00. A value of 1.00 corresponds to a 100% confidence level that the species of the object is accurately identified.

In step 108, the confidence levels of each of the three identified plant species are compared by the identification and analysis component of the computer system, and the species of trees having the highest species confidence level of 0.80 in this example is selected as the most likely species to which the object belongs.

The identification and analysis component of the computer system decides in step 110 if the highest species confidence level 0.80 of the selected species of trees meets or exceeds a predetermined species confidence level threshold value stored in the database. In this case the confidence level 0.80 exceeds the stored predetermined species confidence threshold value of 0.75 for trees so the identification of the species of the object as a tree is valid.

In the case where the species having the highest confidence level selected in step 108 does not meet or exceed the predetermined species confidence level threshold value, then the process would continue in step 112 to gather additional information which could be helpful in identifying the species.

Figure 2:
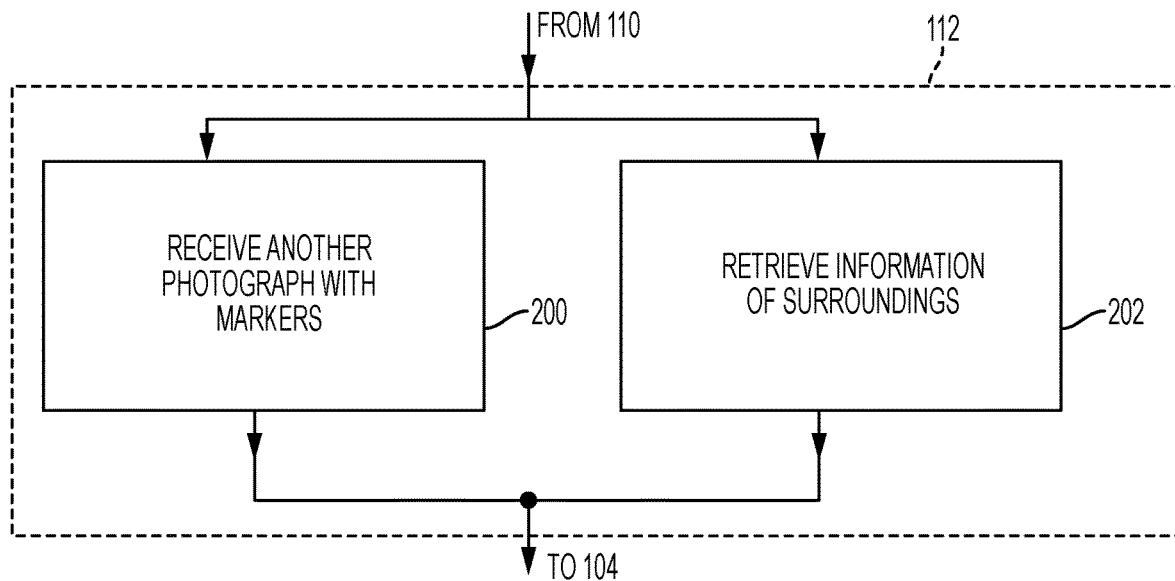
FIG. 2 is a flow chart diagram of a gathering step of the first embodiment of the present invention.

FIG. 2 is a flow chart diagram of a gathering step 112 of an embodiment of the present invention. Additional information gathered in step 112, in response to another user request via the user interface of the computer system, includes (1) receiving another photograph of the object in step 200, such as from another angle or at a higher resolution, or (2) retrieving information in step 202 of the surroundings of the object which could be gleaned from the initial photograph or from additional photographs. The additional information includes markers to assist in more definitely identifying the object or species. Once this additional information is gathered, the process loops back to step 104 to again identify all species associated with the markers from both the initial photograph and the additional photograph.

In FIG. 1 during processing of the feedback loop, when the highest species confidence level of the selected species meets or exceeds the predetermined species confidence level threshold value in step 110, then the selected species is identified as having a high likelihood of matching with the object to be identified in the initial photograph. In this example, the selected species is trees, and the confidence level of 0.80 exceeds the 0.75 database threshold as previously described.

Since the species confidence level exceeds the predetermined species confidence level threshold value noted above, the process continues in step 114 in determining, by the identification and analysis component of the computer system, an object confidence level for identification of each object within the selected species of trees. This is done by comparing the measured values of the properties of the one or more markers present in the initial photograph of the object to be identified with object classifiers of each object of the selected species, whereby the object classifiers are listed in the database of the computer system. In step 116, the object is identified and presented by the computer system to the user, as the object having the highest object confidence level within the objects of the species. In this example, the additional markers more clearly identified the shape of the tree including leave shapes on the tree so that the tree is positively identified as a willow tree. If necessary, the above-described steps of using a feedback loop for species identification could be similarly used to gather additional information for object identification.

The object and species recognition system uses a computer to gather additional information via: the user interface, the database of the computer, the Internet, a global positioning system GPS, a social media platform, or an application programming interface. Additional data regarding surroundings of the object can include: location parameters of the object; atmospheric conditions at the object; color of the object; time and date parameters corresponding to acquisition of the additional data; and environmental conditions at the object.

Figure 3:
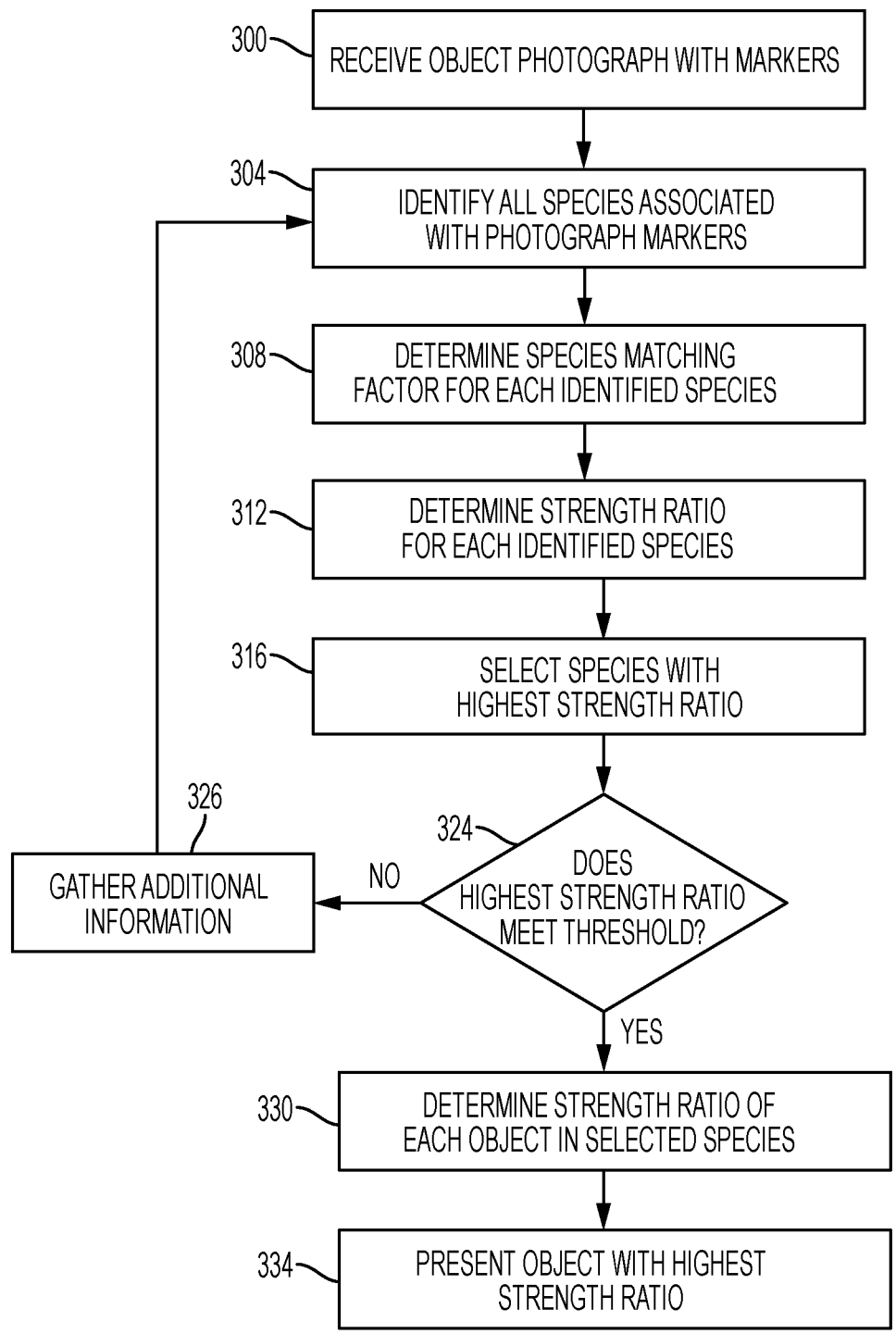
FIG. 3 is a flow chart diagram of a method in accordance with a second embodiment of the present invention.

FIG. 3 is a flow chart diagram of a method in accordance with a second embodiment of the present invention. In step 300 an initial photograph of an object to be identified is received by the object recognition system, in response to a user request via a user interface of a computer system, wherein the initial photograph contains one or more markers from a list of predefined markers stored in a database of the computer system. Each marker present in the initial photograph includes (1) a property of the object, (2) a measured value of the property, (3) identification of an entity for measuring the value of the property of the marker, and (4) an association with one or more species of objects.

Step 304 identifies, by an identification and analysis component of the computer system, one or more species of the object associated with each marker present in the initial photograph by comparing properties and measured values of the one or more markers in the photograph with classifiers of species or objects listed in the database of the computer system.

Figure 7A:
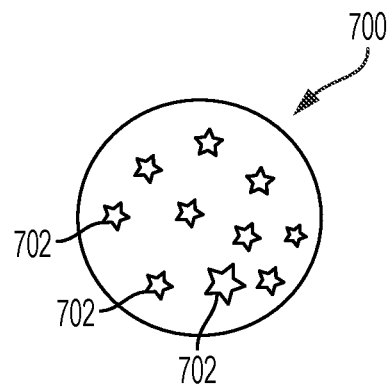
FIG. 7A is a diagrammatic representation of an object or species to be identified in accordance with the present invention.
Figure 7B:
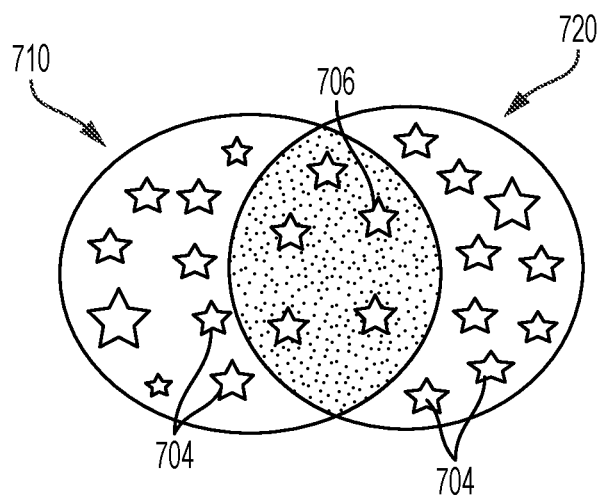
FIG. 7B is a diagrammatic representation of object or species comparisons in accordance with the present invention.

A species matching factor is determined in step 308, by the identification and analysis component of the computer system, for each identified species as a numerical percentage of markers required to meet or exceed the predetermined marker threshold value for the identified species. The species matching factors can be better understood by turning to FIGS. 7A and 7B. FIG. 7A is a diagrammatic representation of an object or species to be identified in accordance with a method of the present invention, and FIG. 7B is a diagrammatic representation of object or species comparisons in accordance with a method of the present invention. The object or species 700 to be identified as depicted in FIG. 7A includes markers 702.

For this example FIG. 7B shows two identified species 710 and 720 whereby the intersecting section of the species represents markers 706 that match with the species 700 to be identified. Conversely, the non-intersecting sections of the species 710 and 720 include markers 704 that do not match with the markers 702 of species 700. In this case, species 710 matches 30% of its markers with species 700 corresponding to a 0.30 species matching factor, and species 720 matches 20% of its markers with species 700 corresponding to a 0.20 species matching factor.

In step 312 a marker strength ratio is determined, by the identification and analysis component of the computer system, for each marker present in the object of the initial photograph. The strength ratio for each marker is determined by multiplying a predetermined species weighting factor times the species matching factor for each identified species. The predetermined species weighting factors are stored in the database. In the current example the species 710 has a predetermined species weighting factor of 0.4 and a species matching factor of 0.30, so the marker strength ratio for species 710 is: 0.4*0.3=0.12. Species 720 has a predetermined species weighting factor of 0.5 and a species matching factor of 0.2 so the marker strength ratio for species 720 is: 0.5*0.2=0.10.

Step 316 compares the strength ratios of each of the identified species and selects the species having the highest strength ratio. In this case, species 710 is selected as having the highest strength ratio of 0.12 as determined by the identification and analysis component of the computer system. In step 324 the identification and analysis component of the computer system determines whether the highest strength ratio meets or exceeds the predetermined strength ratio threshold value of the identified species in the database. If the threshold value is not met, then the process enters the feedback loop in step 326 where additional information is gathered to further qualify the identified species of the object in the initial photograph.

Figure 4:
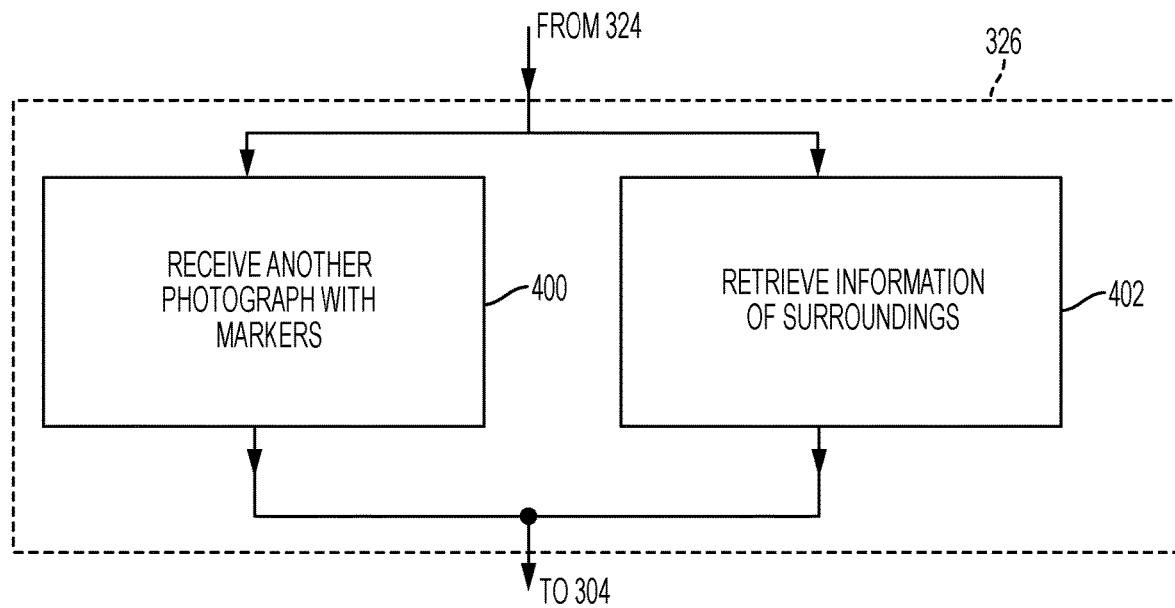
FIG. 4 is a flow chart diagram of a gathering step of the second embodiment of the present invention.

FIG. 4 is a flow chart diagram of the gathering step 326 which begins with another user request via the user interface of the computer system for additional information to include (1) receiving another photograph of the species in step 400, such as from another angle or at a higher resolution, or (2) retrieving information in step 402 of the surroundings of the species which could be gleaned from the initial photograph or from an additional photograph. The additional information includes markers to assist in more definitely identifying the species. Once the additional information is gathered, the process loops back to step 304 to again identify all species associated with the markers from the both the initial photograph and the additional photograph.

In the case when the selected species includes the highest marker strength ratio which meets or exceeds the predetermined strength ratio threshold value for that species in step 324, then the selected species is identified as a valid identification.

The process continues in step 330 to determine, via the identification and analysis component of the computer system, a strength ratio for markers of each object within the selected species. This is done in the same manner as described above for species identification. Strength ratios for each marker of objects within the selected species are determined by multiplying each object matching factor times a corresponding predetermined object weighting factor stored in the database. Steps for gathering additional information of an object can be provided if necessary as described above for gathering additional information for a species. The object having the highest strength ratio is presented to the user by the computer system in step 334. If the goal of the user is species identification rather than object identification, then the identified species can be presented to the user, or both the identified species and the identified object can be presented to the user.

Figure 5:
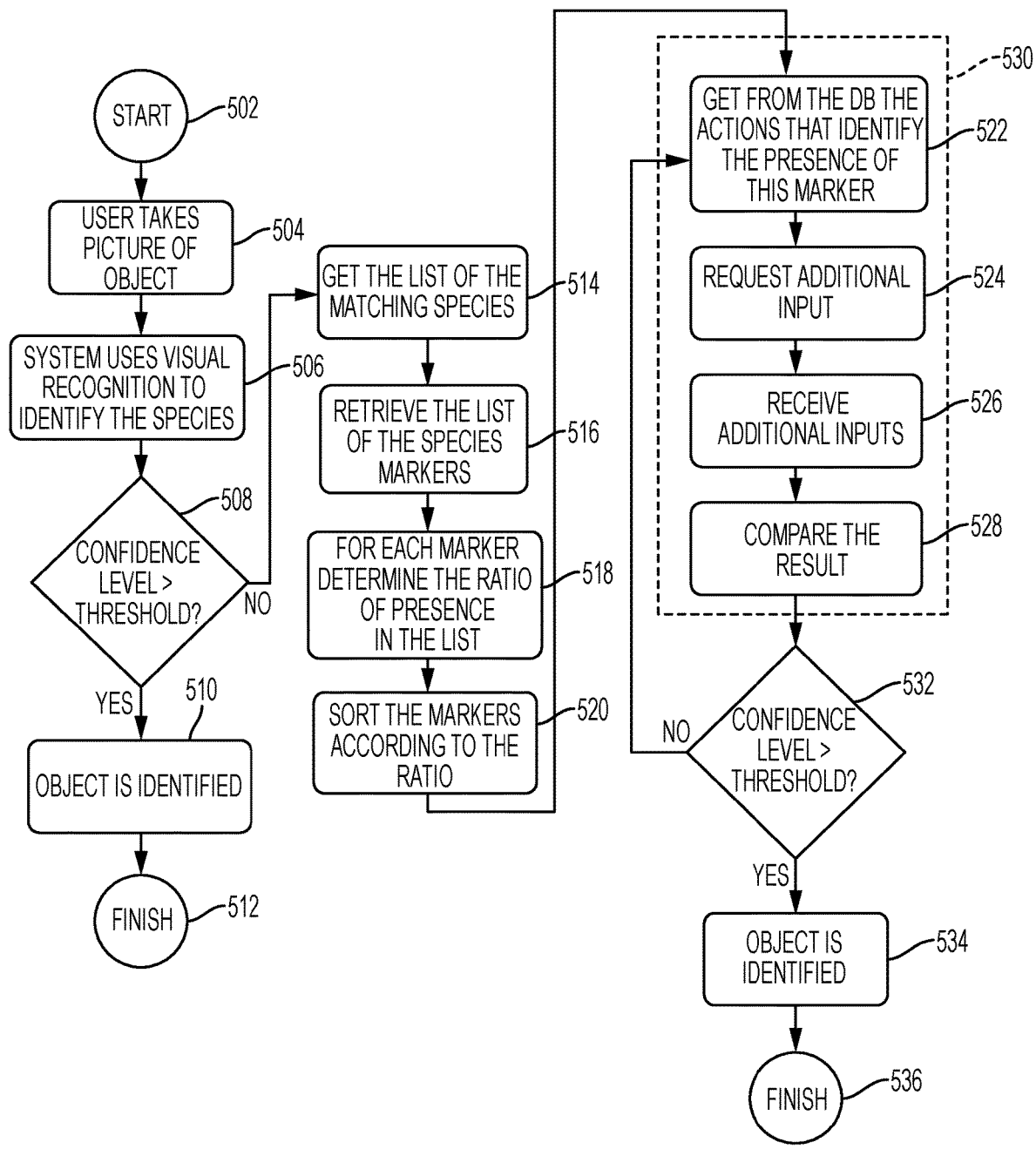
FIG. 5 is a flow chart diagram of a method in accordance with a third embodiment of the present invention.

FIG. 5 is a flow chart diagram of a method in accordance with a third embodiment of the present invention. The method starts in step 502 and a user will take an initial photograph of an object with a user interface, for instance with a camera on a mobile phone, in step 504. The computerized object recognition tool or system receives the initial photograph and attempts to visually identify the object in step 506 using machine learning classifiers. In machine learning and statistics, classification is the problem of identifying to which of a set of categories or subpopulations a new observation belongs, on the basis of a training set of data containing observations or instances whose category membership is known. In step 508 if the visual recognition results in an acceptable confidence level greater than a predetermined threshold from a database, then the object is identified and presented to the user in steps 510 and 512. The confidence levels can be set by the user, or obtained from predetermined standards in the database.

If the required confidence level does not reach the predetermined threshold in step 508, then the object markers in the initial photograph will be compared with species (e.g. classification) markers stored in the database. In step 514 a list of matching species having markers present in the object of the photograph is obtained from the database. The species markers for each of the identified species is retrieved in step 516. In step 518 a strength ratio is determined for each marker present in the object, and the strength ratios are sorted and numerically ordered in step 520, for instance from strongest to weakest. In step 522 the object recognition system retrieves additional actions from the database to assist in identifying each marker. In step 524 a request is made by the system based upon the retrieved additional actions to further identify a marker. For instance, an additional action may request a rear view photograph of the object. An additional photograph is received from the user in step 526 and the results are compared in step 528 where again the strength ratios are determined for all the markers, including new markers received from the additional photograph. If the confidence level of a selected object within one of the identified species meets or exceeds a predetermined confidence level object threshold in step 532, then the object is identified and presented to the user in step 534 and the workflow finishes in step 536. Otherwise, if the confidence level in step 532 does not meet the predetermined confidence level object threshold, then the processes continues back into step 522 of the feedback loop 530 to receive additional information and additional markers to assist in identifying the object.

Figure 6:
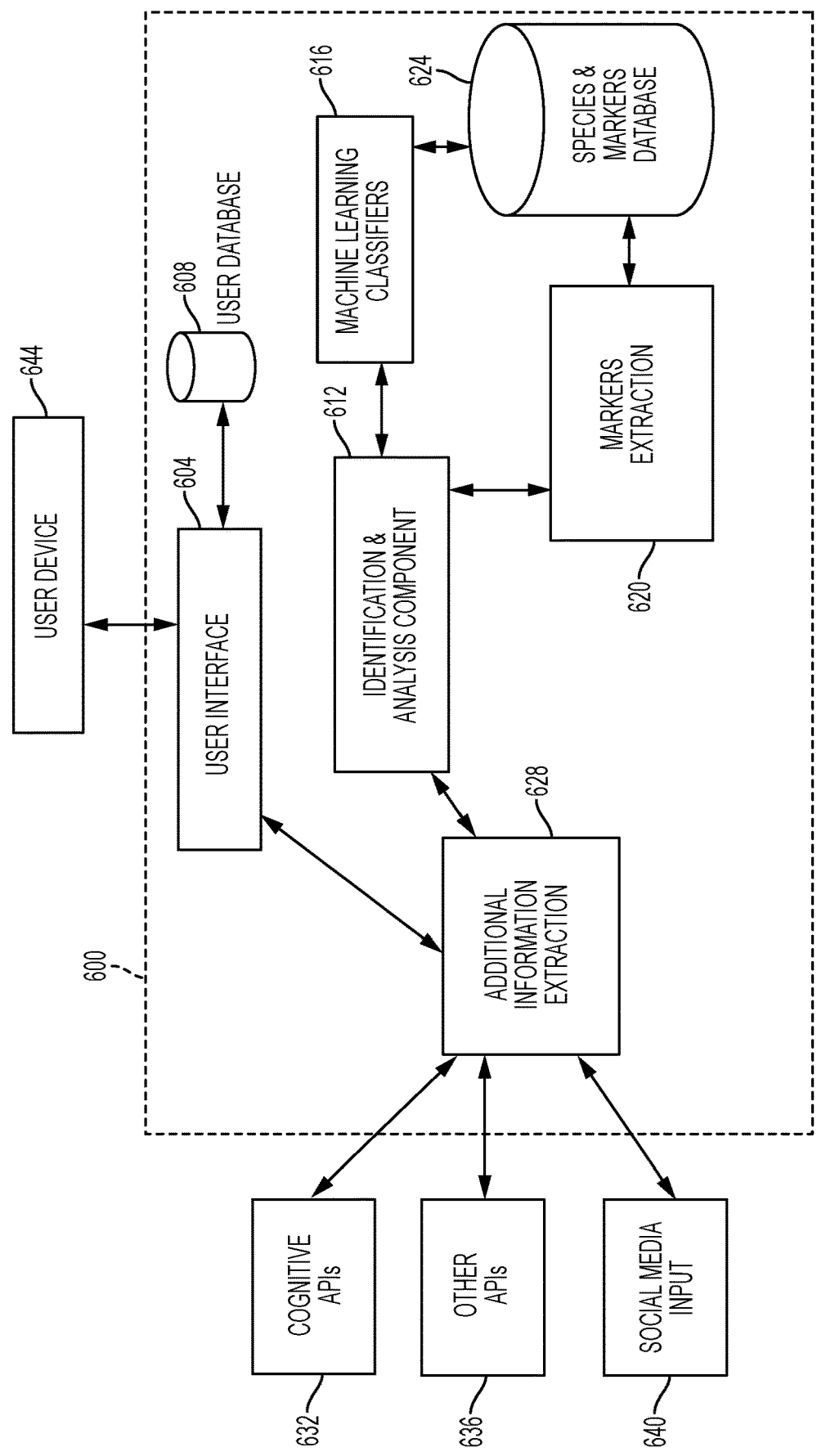
FIG. 6 is a system representation of components for operation of an object identification system and method of the present invention.

FIG. 6 is a system diagram of components of an object identification system 600 of the present invention. A user via device 644 will log into the user interface 604 to perform various activities such as: managing his profile; defining his preferences; requesting identification of an item by taking a picture of the item; and providing the system with additional information if requested by the system. The user interface 604 allows the system to gather information and guide the user throughout the process of object identification, and the user database 608 stores all the user data.

The identification and analysis component/system 612 is the core element of the object identification system 600. The function of this component is to guide the user through the process of identification upon receipt of an initial photograph of an object to be identified. The species and markers database 624 stores a profile for each species and each profile can contain a full description, properties, dimensional values and photographs of an object within the given species. Machine learning classifiers 616 use the images from the species and markers database 624 to train classifiers (e.g. markers) for differentiating and recognizing each species. Each classifier will return a confidence level, for instance, a value between 0 and 1 where 1 is the highest confidence level and 0 is the lowest.

The markers extraction component 620 receives a list of species as input and provides an ordered list of markers of each species on the list as output. The markers extraction component 620 retrieves the list of markers from the species and markers database 624 for each species from the input list. Thereafter the markers extraction component 620 sorts the markers for relevance. When there are many identified species of a given object, the best marker for differentiation is typically the marker that will split the list of possible species into two parts, thus allowing elimination of half of the list.

The additional information extraction component 628 coordinates a user request for additional information with outside sources such as cognitive application programming interfaces (API) 632, other APIs 636 and social media input 640. For example, an API may be able to provide atmospheric conditions or general weather conditions at an object location. In another example, social media input can provide insight on what people are discussing with regards to the a species, and can also provide positive or negative feedback.

Figure 8:
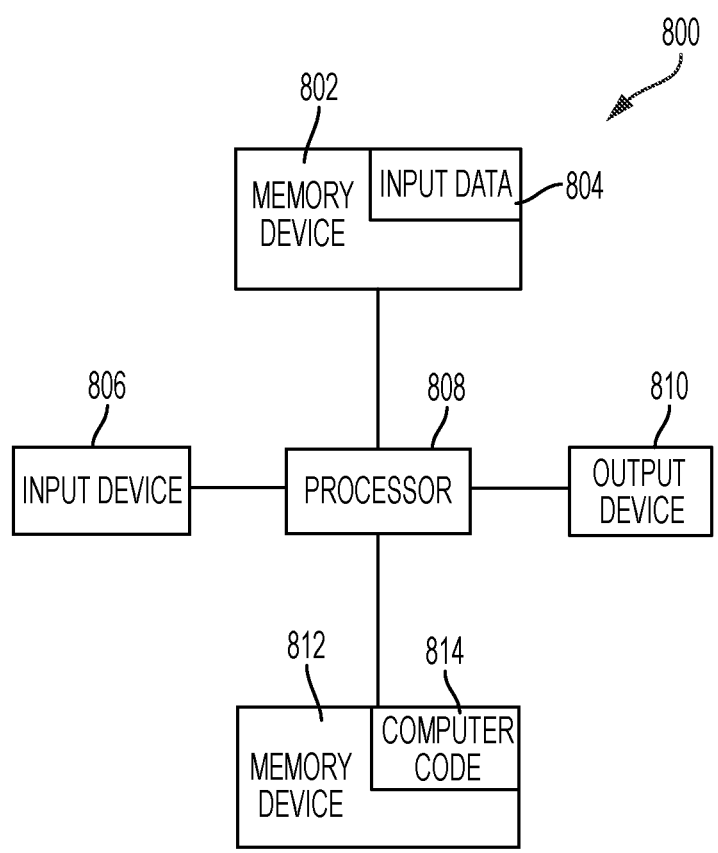
FIG. 8 illustrates an embodiment of a computing system used for implementing the methods of the present invention.

FIG. 8 is a block diagram of a computer system, aka computing device, 800 for species or object identification in accordance with embodiments of the present invention. The computing device 800 includes a processor 808, an input device 806 coupled to the processor 808, an output device 810 coupled to the processor 808, and memory devices 802 and 812 each coupled to the processor 808. The input device 806 may be, inter alia, a keyboard, a mouse, etc. The output device 810 may be, inter alia, a printer, a plotter, a computer screen, a magnetic tape, a removable hard disk, a floppy disk, etc. The memory devices 802 and 812 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 812 includes a computer code 814 which is a computer program that includes computer-executable instructions.

The computer code 814 includes software or program instructions that may implement an algorithm for implementing methods of the present invention. The processor 808 executes the computer code 814. The memory device 802 includes input data 804. The input data 804 includes input required by the computer code 814. The output device 810 displays output from the computer code 814. Either or both memory devices 802 and 812 (or one or more additional memory devices not shown) may be used as a computer usable storage medium (or program storage device) having a computer readable program embodied therein and/or having other data stored therein, wherein the computer readable program includes the computer code 814.

Generally, a computer program product (or, alternatively, an article of manufacture) of the computer system/device 800 may include the computer usable storage medium (or said program storage device). The processor 808 may represent one or more processors. The memory device 802 and/or the memory device 812 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The inventive system and method is not limited to visual recognition, or recognition of an object in a photograph. The representation of the object to be identified can be provided in any known form to represent an object such as but not limited to, imagery, sonic recognition, encryption symbols, recognition from electromagnetic waves, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An object identification method, comprising:
    (A) receiving, in response to a first user request via a user interface of a computer system, an initial photograph of an object to be identified,
        wherein the initial photograph contains one or more markers from a list of predefined markers stored in a database of the computer system,
        wherein each marker present in the initial photograph includes (1) a property of the object, (2) a measured value of the property, (3) identification of an entity for measuring the value of the property of the marker, and (4) an association with one or more species of objects;
    (B) identifying, by an identification and analysis component of the computer system, one or more species of the object associated with each marker present in the initial photograph by comparing the measured values of the properties of the one or more markers present in the initial photograph of the object with classifiers of species listed in the database of the computer system;
    (C) determining, by the identification and analysis component of the computer system, for each identified species a species confidence level of species identification of the object by comparing the measured values of the properties of the one or more markers present in the initial photograph with predetermined marker threshold values stored in the database for each identified species;
    (D) selecting, by the identification and analysis component of the computer system, the identified species having a corresponding highest species confidence level in comparison to the species confidence levels of the other identified species;

determining, by the identification and analysis component of the computer system, if the highest species confidence level of the selected species meets or exceeds a predetermined species confidence level threshold value stored in the database;

when the highest species confidence level of the selected species meets or exceeds the predetermined species confidence level threshold value, then determining, by the identification and analysis component of the computer system, an object confidence level of identification for each object within the selected species by comparing the measured values of the properties of the one or more markers present in the initial photograph of the object to be identified with object classifiers of each object of the selected species, said object classifiers listed in the database of the computer system; and presenting, by the computer system to the user, the identified object having a highest object confidence level of the objects within the selected species; and when said highest species confidence level is below the predetermined species confidence level threshold value, then (i) receiving, in response to a second user request via the user interface of the computer system, additional data to assist in identifying the object, the additional data comprising atmospheric conditions at the object and (ii) repeating steps (B) through (D) in consideration of the additional data.

2. The method of claim 1, wherein the information regarding surroundings of the object is gathered by the computer system in response to the user request, or the information regarding surroundings of the object is gleaned from the initial photograph or from another photograph received by the computer system.

3. A computer program product, comprising one or more computer readable hardware storage devices having computer readable program code stored therein, said program code containing instructions executable by a computing device to implement an object identification method comprising:

(A) receiving, in response to a first user request via a user interface of a computer system, an initial photograph of an object to be identified, wherein the initial photograph contains one or more markers from a list of predefined markers stored in a database of the computer system, wherein each marker present in the initial photograph includes (1) a property of the object, (2) a measured value of the property, (3) identification of an entity for measuring the value of the property of the marker, and (4) an association with one or more species of objects;

(B) identifying, by an identification and analysis component of the computer system, one or more species of the object associated with each marker present in the initial photograph by comparing the measured values of the properties of the one or more markers present in the initial photograph of the object with classifiers of species listed in the database of the computer system;

(C) determining, by the identification and analysis component of the computer system, for each identified species a species confidence level of species identification of the object by comparing the measured values of the properties of the one or more markers present in the initial photograph with predetermined marker threshold values stored in the database for each identified species;

(D) selecting, by the identification and analysis component of the computer system, the identified species having a corresponding highest species confidence level in comparison to the species confidence levels of the other identified species;

determining, by the identification and analysis component of the computer system, if the highest species confidence level of the selected species meets or exceeds a predetermined species confidence level threshold value stored in the database;

when the highest species confidence level of the selected species meets or exceeds the predetermined species confidence level threshold value, then determining, by the identification and analysis component of the computer system, an object confidence level of identification for each object within the selected species by comparing the measured values of the properties of the one or more markers present in the initial photograph of the object to be identified with object classifiers of each object of the selected species, said object classifiers listed in the database of the computer system; and presenting, by the computer system to the user, the identified object having a highest object confidence level of the objects within the selected species; and when said highest species confidence level is below the predetermined species confidence level threshold value, then (i) receiving, in response to a second user request via the user interface of the computer system, additional data to assist in identifying the object, the additional data comprising atmospheric conditions at the object and (ii) repeating steps (B) through (D) in consideration of the additional data.

4. A system, comprising a computing device, said computing device comprising one or more processors, one or more memories, and one or more computer readable hardware storage devices, said one or more hardware storage devices containing program code executable by the one or more processors via the one or more memories to identify an object, the method comprising:

(A) receiving, in response to a first user request via a user interface of a computer system, an initial photograph of an object to be identified, wherein the initial photograph contains one or more markers from a list of predefined markers stored in a database of the computer system, wherein each marker present in the initial photograph includes (1) a property of the object, (2) a measured value of the property, (3) identification of an entity for measuring the value of the property of the marker, and (4) an association with one or more species of objects;

(B) identifying, by an identification and analysis component of the computer system, one or more species of the object associated with each marker present in the initial photograph by comparing the measured values of the properties of the one or more markers present in the initial photograph of the object with classifiers of species listed in the database of the computer system;

(C) determining, by the identification and analysis component of the computer system, for each identified species a species confidence level of species identification of the object by comparing the measured values of the properties of the one or more markers present in the initial photograph with predetermined marker threshold values stored in the database for each identified species; and (D) selecting, by the identification and analysis component of the computer system, the identified species having a corresponding highest species confidence level in comparison to the species confidence levels of the other identified species;

determining, by the identification and analysis component of the computer system, if the highest species confidence level of the selected species meets or exceeds a predetermined species confidence level threshold value stored in the database;

when the highest species confidence level of the selected species meets or exceeds the predetermined species confidence level threshold value, then determining, by the identification and analysis component of the computer system, an object confidence level of identification for each object within the selected species by comparing the measured values of the properties of the one or more markers present in the initial photograph of the object to be identified with object classifiers of each object of the selected species, said object classifiers listed in the database of the computer system; and presenting, by the computer system to the user, the identified object having a highest object confidence level of the objects within the selected species; and when said highest species confidence level is below the predetermined species confidence level threshold value, then (i) receiving, in response to a second user request via the user interface of the computer system, additional data to assist in identifying the object, the additional data comprising atmospheric conditions at the object and (ii) repeating steps (B) through (D) in consideration of the additional data.

* * * * *